(12) United States Patent
Noh et al.

(10) Patent No.: US 8,599,199 B2
(45) Date of Patent: Dec. 3, 2013

(54) STEREOSCOPIC IMAGE GENERATION METHOD OF BACKGROUND TERRAIN SCENES, SYSTEM USING THE SAME, AND RECORDING MEDIUM FOR THE SAME

(75) Inventors: Jun Yong Noh, Daejeon (KR); Hui Cheol Hwang, Daegu (KR); Kye Hyun Kim, Daejeon (KR)

(73) Assignee: Korea Advanced Institute of Science and Technology (KAIST), Daejeon (KR)

( * ) Notice: Subject to any disclaimer, the term of this patent is extended or adjusted under 35 U.S.C. 154(b) by 284 days.

(21) Appl. No.: 13/075,870

(22) Filed: Mar. 30, 2011

(65) Prior Publication Data
US 2012/0169715 A1 Jul. 5, 2012

(30) Foreign Application Priority Data
Jan. 3, 2011 (KR) ........................ 10-2011-0000260

(51) Int. Cl.
*G06T 15/00* (2011.01)
*G06T 1/00* (2006.01)
*G06F 17/00* (2006.01)
*G09G 5/00* (2006.01)

(52) U.S. Cl.
USPC ............ 345/419; 345/418; 345/582; 345/679

(58) Field of Classification Search
None
See application file for complete search history.

(56) References Cited

U.S. PATENT DOCUMENTS

| 6,359,629 | B1 * | 3/2002 | Hopcroft et al. ............. 345/620 |
| 7,333,132 | B2 * | 2/2008 | Shimizu et al. ............ 348/208.1 |
| 8,363,051 | B2 * | 1/2013 | Deffeyes ........................ 345/419 |
| 2002/0190988 | A1 * | 12/2002 | Maillot et al. ................ 345/428 |
| 2003/0063672 | A1 * | 4/2003 | Laurent-Chatenet .... 375/240.16 |
| 2008/0123927 | A1 * | 5/2008 | Miga et al. ..................... 382/131 |
| 2008/0221843 | A1 * | 9/2008 | Shenkar et al. ................... 703/1 |
| 2009/0059096 | A1 * | 3/2009 | Yamamoto et al. ........... 348/746 |
| 2009/0154794 | A1 * | 6/2009 | Kim et al. ..................... 382/154 |
| 2011/0148875 | A1 * | 6/2011 | Kim et al. ..................... 345/420 |
| 2012/0078510 | A1 * | 3/2012 | Ma et al. ....................... 701/426 |

* cited by examiner

*Primary Examiner* — Ulka Chauhan
*Assistant Examiner* — Saptarshi Mazumder
(74) *Attorney, Agent, or Firm* — Rabin & Berdo, P.C.

(57) ABSTRACT

Disclosed herein are a stereoscopic image generation method of background terrain scenes, a system using the same, and a recording medium for the same. The stereoscopic image generation method of background terrain scenes includes an initial mesh creation step of creating an initial mesh using terrain geometry based on image sequences, a geometry error correction step of generating a projection map, detecting error regions of the initial mesh using the generated projection map, generating a vector map of the detected error regions, and generating a corrected mesh, error of which is corrected, and a stereo conversion step of generating a stereoscopic image using the corrected mesh. Since the stereoscopic image is generated based on the mesh, the mesh fits the terrain shape even though the geometry is complex. Further, time coherence can be enforced, the mesh can be edited easily, and new elements can be unseamingly composed into the terrain. Thus, it is possible to prevent a viewer who views the stereoscopic image from becoming tired.

12 Claims, 9 Drawing Sheets

STEREOSCOPIC IMAGE GENERATION METHOD OF BACKGROUND TERRAIN SCENES, SYSTEM USING THE SAME, AND RECORDING MEDIUM FOR THE SAME

CROSS-REFERENCE TO RELATED APPLICATION

This application claims priority to Korean Patent Application No. 10-2011-0000260, filed on Jan. 3, 2011, and all the benefits accruing therefrom under 35 U.S.C. §119, the contents of which in its entirety are herein incorporated by reference.

BACKGROUND

1. Field

The present disclosure relates to a stereoscopic image generation method, a system using the same, and a recording medium for the same, and, more particularly, to a stereoscopic image generation method of background terrain scenes, a system using the same, and a recording medium for the same.

2. Description of the Related Art

With the development of the three-dimensional (3D) display technology, demand for stereoscopic 3D images is rapidly increasing. Many of the recently released movies have been produced in 3D stereo. The stereo effects provide the audience with vivid realism by assigning different depths to layers of differing distances.

In a typical move, a variety of background sceneries are captured from the sky using an airplane or a helicopter. It is extremely difficult, however, to shoot such scenes with a stereo camera rig in an airplane or a helicopter. A successful stereo reconstruction requires correct calibration of the cameras. This calibration is very sensitive and, in an environment such as a helicopter, the vibrations of the engine can easily misalign the cameras. A better alternative is to shoot background terrain scenes with a single camera and to convert them into 3D.

There are two different approaches in conversion from two-dimensional (2D) image to 3D image. One is fully image based approach and the other is geometry based approach. In general, for 2D to 3D conversion of terrain scenes, geometry based approach is better than image based approach. The image based approach is not suitable for compositing objects other than terrain and is hard to modify depth information. One of the key advantages of the geometry based approach is that the time coherence is easily enforced and it gives accurate data for inter-object depth using terrain geometry.

Although there have been several previous approaches on creating terrain geometry using images, they were majorly concerned on applying the geometry for compositing objects. Accordingly, such methods aim to recreate a smooth surface where virtual characters could be placed and somehow disregard smaller errors in benefit of smoothness and manageable geometry. However, smaller imperfections in the geometry have influence on the creation of virtual images, which could lead to visual fatigue if such imperfections persist the length of the film. Thus, there is a need for solving the problem of refining the estimated geometry in order to minimize the errors.

Depth information can be divided into two types, which are inter-object depth and inner-object depth. The inter-object depth is the relative depth between two objects in the scene and it is important especially at the boundaries of the objects since an error in the inter-object depth will produce remarkable visual artifacts. The inner-object depth means the depth variation within a single object region. Many 2D to 3D conversion algorithms recover the inter-object depth but disregard the inner-object depth resulting often in the so-called card board effect. Manual recovery of inter-object depth can be easily achieved by rotoscoping the scene objects and it has become a usual practice in 2D to 3D conversion. In contrast, it is hard to get the accurate inner-object depth. In large terrain scenes, the terrain often varies smoothly, thus, in order to recover the geometry, the inner-object depth is mainly used.

SUMMARY

The present disclosure is directed to providing a stereoscopic image generation method of background terrain scenes.

The present disclosure is also directed to providing a stereoscopic image generation system of background terrain scenes.

In one aspect, there is provided a stereoscopic image generation method of background terrain scenes, including an initial mesh creation step of creating an initial mesh using terrain geometry based on image sequences, a geometry error correction step of generating a projection map, detecting error regions of the initial mesh using the generated projection map, generating a vector map of the detected error regions, and generating a corrected mesh, error of which is corrected, and a stereo conversion step of generating a stereoscopic image using the corrected mesh.

The initial mesh generation step may include generating the initial mesh using a radial basis function (RBF) method.

The geometry error correction step may include a feature point extraction step of extracting a plurality of feature points of the initial mesh using the projection map, a vector map generation step of detecting sliding feature points of the plurality of feature points as the error regions of the initial mesh, generating a plurality of vectors for fixing the sliding feature points such that the error regions are corrected, and generating the vector map, and a mesh correction step of generating the corrected mesh using the vector map.

The feature point extraction step may include a texture map generation step of projecting the image sequences to the initial mesh for each frame of the image sequences and generating texture maps, a visibility map generation step of generating visibility maps using a ray tracing method so as to represent a visible area and an invisible area for each frame in the initial mesh, a projection map generation step of composing the texture maps and the visibility maps so as to generate the projection map, and an scale-invariant feature transform (SIFT) applying step of applying SIFT to the projection map so as to extract the plurality of feature points.

The vector map generation step may include a feature point excluding step of excluding feature points on or near the invisible area if the invisible area of the initial mesh is detected by the visibility maps, a feature point determination step of determining whether or not each of the remaining feature points except for the excluded feature points of the plurality of feature points moves, a position determination step of determining positions where the moving feature points determined by the feature point determination step are placed, and a vector generation step of generating the plurality of vectors for moving the feature points such that the moving feature points are fixed to the determined positions and generating the vector map.

The position detection step may include determining the positions where the moving feature points are placed using a triangle method.

The stereo conversion step may include a stereoscopic image generation step of generating a depth map using the corrected mesh and generating the stereoscopic image, and an object depth movement step of generating a final depth map based on moving objects and adjusting the depths of the objects of the stereoscopic image based on the generated final depth map.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A stereoscopic image generation method of background terrain scenes, a system using the same and a recording medium for the same according to the present disclosure enables to reconstruct an accurate 3D geometry model from sequences of a terrain scenery image, since both inter-object depth information and inner-object depth information can be acquired using geometry.

Figure 1:
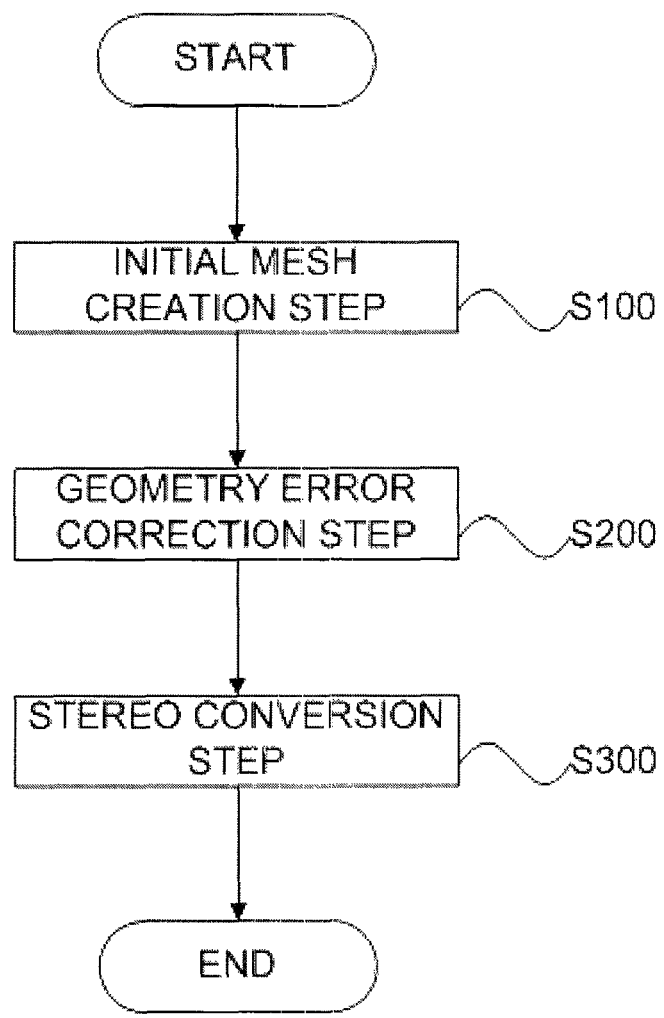
FIG. 1 is a diagram showing a stereoscopic image generation method using terrain geometry according to an embodiment.

FIG. 1 is a diagram showing a stereoscopic image generation method using terrain geometry according to an embodiment. Referring to FIG. 1, the stereoscopic image generation method using the terrain geometry according to the embodiment includes an initial mesh creation step (S100), a geometry error correction step (S200) and a stereo conversion step (S300).

In the initial mesh creation step (S100), an initial mesh for generating terrain geometry is created. Although there are several methods of creating the initial mesh, in the embodiment, for example, the initial mesh is created using terrain geometry based on image sequences. The method of creating the initial mesh using the terrain geometry uses a radial basis function (RBF) method. In the RBF method, since a vacant area is filled using a method for finding the smooth bivariate terrain height due to a height determined from neighboring points, it is possible to make smooth mesh and thus to make smooth terrain geometry. However, since this mesh includes errors, it is difficult to generate an accurate stereoscopic image upon 2D to 3D conversion. Therefore, if a stereoscopic image is generated using this mesh, a difference between an interpreted depth and an actual depth occurs, thus causing viewers to become tired. Therefore, it is necessary to correct the initial mesh for 2D to 3D conversion.

In the geometry error correction step (S200), the initial mesh is corrected. In an embodiment, error of the mesh is corrected using a projection map. In order to correct the error of the initial mesh, first, an error region of the initial mesh is detected. The projection map is used to detect the error region and may be generated using the initial mesh and image sequences. Actually, the projection map is a texture map of the initial mesh. If texture for a specific mesh is fixed and is not moved on the projection map, the mesh is on the right region and, if the texture slides, the mesh is on the wrong region. Accordingly, in an embodiment, the error region is corrected using information about sliding texture.

In the stereo conversion step (S300), a stereoscopic 3D image is generated based on the corrected mesh. In the stereo conversion step (S300), a depth map is generated and the depth of an objected to be composed is adjusted.

Figure 2:
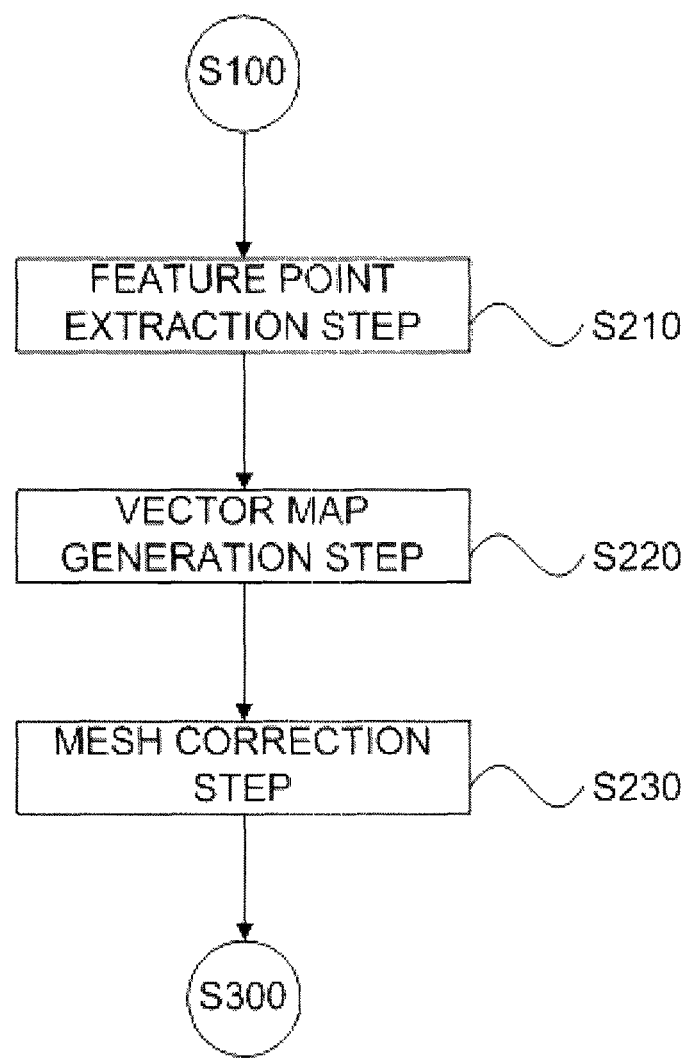
FIG. 2 is a diagram showing a geometry error correction step of FIG. 1 in detail.

FIG. 2 is a diagram showing the geometry error correction step of FIG. 1 in detail. Referring to FIG. 2, the geometry error correction step S200 includes a feature point extraction step (S210), a vector map generation step (S220) and a mesh correction step (S230).

In the feature point extraction step (S210), the projection map of the mesh for each frame is generated in order to point out a specific part of the mesh having the sliding texture. At this time, the projection map may be generated by composing texture maps and visibility maps.

Figure 3:
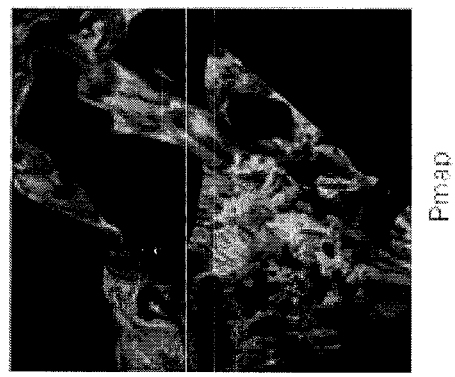
FIG. 3 is a diagram showing an example of a method of composing texture maps and visibility maps so as to generate a projection map.
Figure 3:
Figure 3:
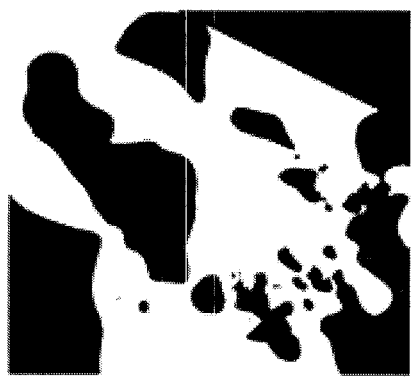
Figure 3:
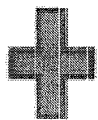
Figure 3:
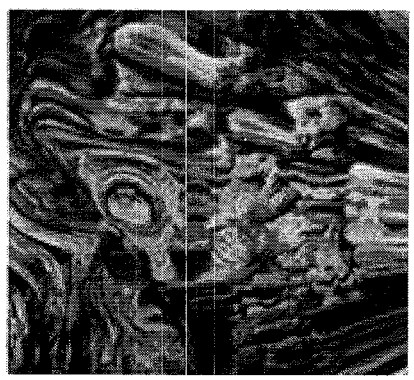

FIG. 3 is a diagram showing an example of a method of composing texture maps and visibility maps so as to generate a projection map.

First, the texture maps Tmap are generated by projecting the image sequence on the mesh for each frame. Since the mesh is generated from a regular rectangular mesh, the texture maps Tmap can be easily obtained by rendering the mesh from the top view.

$$T_i(x,y) = \text{Color of } M(x,z) \quad \text{Equation 1}$$

when $I_i$ is projected from $C_i$

Equation 1 shows a method of creating the texture maps Tmap. In Equation 1, i is a frame number and y equals z. $T_i$ is a texture map of an i-th frame, M is an initial mesh, $I_i$ is an image of the i-th frame, and $C_i$ is the camera position of the i-th frame.

Then, visibility maps Vmap, which represent visible and invisible areas for each frame in the mesh, are created. The visibility maps Vmap may be easily created using a ray tracing method. The visibility maps Vmap are rendered from the top view, similarly to the texture maps Tmap.

$$V_i(x, y) = \begin{cases} 1 & \text{if } M \text{ is visible from } C_i \\ 0 & \text{if } M \text{ is invisible from } C_i \end{cases} \quad \text{Equation 2}$$

Equation 2 shows a method of creating the visibility maps Vmap. As shown in Equation 1, i is the frame number and y equals z. The visibility maps Vmap represent whether the initial mesh M is visible or invisible from the camera position $C_i$ of the i-th frame as shown by Equation 2. For each frame, as shown in FIG. 3, the visibility maps Vmap are used as alpha channels and the texture maps Tmap are applied to the visibility maps so as to obtain a projection map (Pmap) image.

$$TV_i(x,y) = T_i(x,y) * V_i(x,y) \quad \text{Equation 3}$$

Equation 3 shows a method of creating the projection map Pmap. In Equation 3, the projection map Pmap ($TV_i$) can be obtained by composing the texture maps Tmap obtained from Equation 1 and the visibility maps Vmap obtained from Equation 2.

If the projection map is generated obtained from Equation 3, it is possible to obtain feature points on the projection map using scale-invariant feature transform (SIFT). SIFT is a detection and recognition technique using invariable features (for example, scale or expression) and partially invariable features (for example, brightness) of certain characteristics of the image. That is, SIFT is an algorithm for extracting information best representing a specific object. Here, the information best representing the specific object means information which is not changed even when the position, the direction and the size of the object is changed.

In an embodiment, the feature points on the projection map obtained using SIFT are used to correct the mesh. However, when the feature points on the projection map are obtained using SIFT, feature points located on or near the invisible area are excluded since they tend to be erroneous. Only the feature points having a high priority and the feature points appearing only in couples of frames having a low priority remain. In an embodiment, high priority points are used in order to correct the mesh.

Figure 4:
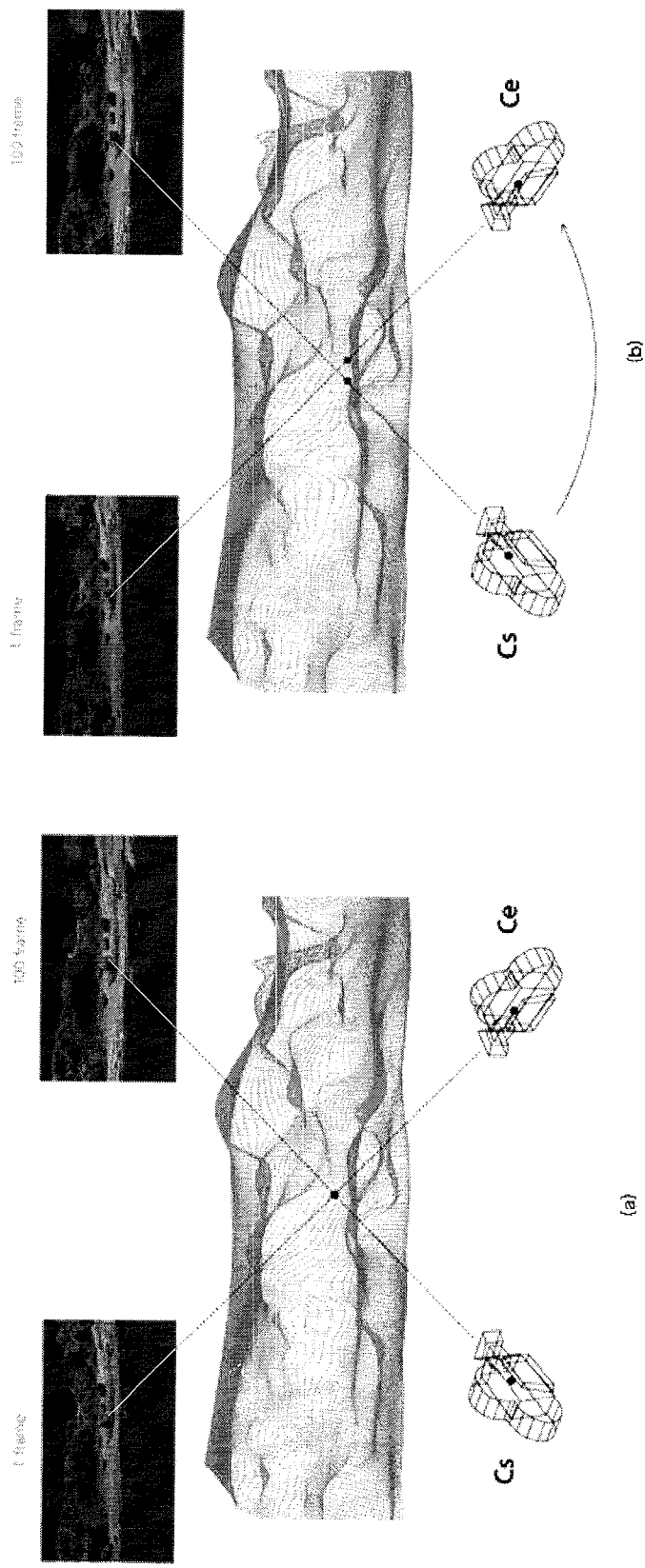
FIG. 4 is a diagram illustrating an example of a method of finding an error region using texture maps of an initial mesh.

FIG. 4 is a diagram illustrating an example of a method of finding an error region using the texture maps of the initial mesh.

As described above, there are moving feature points and non-moving feature points. Non-moving feature point means that that part of the mesh is correct. On the other hand, moving feature point means the mesh is different from the real terrain.

FIG. 4 (a) shows the mesh of the correct region in which the feature points are fixed, and FIG. 4 (b) shows the mesh of the error region in which the feature points move (slide). In FIG. 4, Cs is the starting position of the camera for the frame and Ce is the ending position of the camera for the frame. The point pointed out by the starting position Cs of the camera and the point pointed out by the ending position Ce of the camera are identical in FIG. 4 (a). However, in FIG. 4 (b), the point pointed out by the starting position Cs of the camera and the point pointed out by the ending position Ce of the camera are different. That is, it means that the feature points slide. Accordingly, it means that the mesh is different from the actual terrain.

Therefore, in an embodiment, by fixing the mesh such that there is no moving feature point, it is possible to obtain more accurate mesh.

In the vector map generation step (S220) of FIG. 2, the vector map for fixing the mesh is generated such that there is no sliding feature point.

In order to generate the vector map, it is necessary to find the accurate position of the mesh by observing the movement of the feature points. In a region where there is some geometry error, the detected feature points move (slide) as described above. If the motion of the feature points follows the movement of the camera in the same direction, the part of the mesh is actually closer to the camera. In contrast, if the movements of the camera and the feature points are opposed, the part of the mesh is far from the camera.

Figure 5:
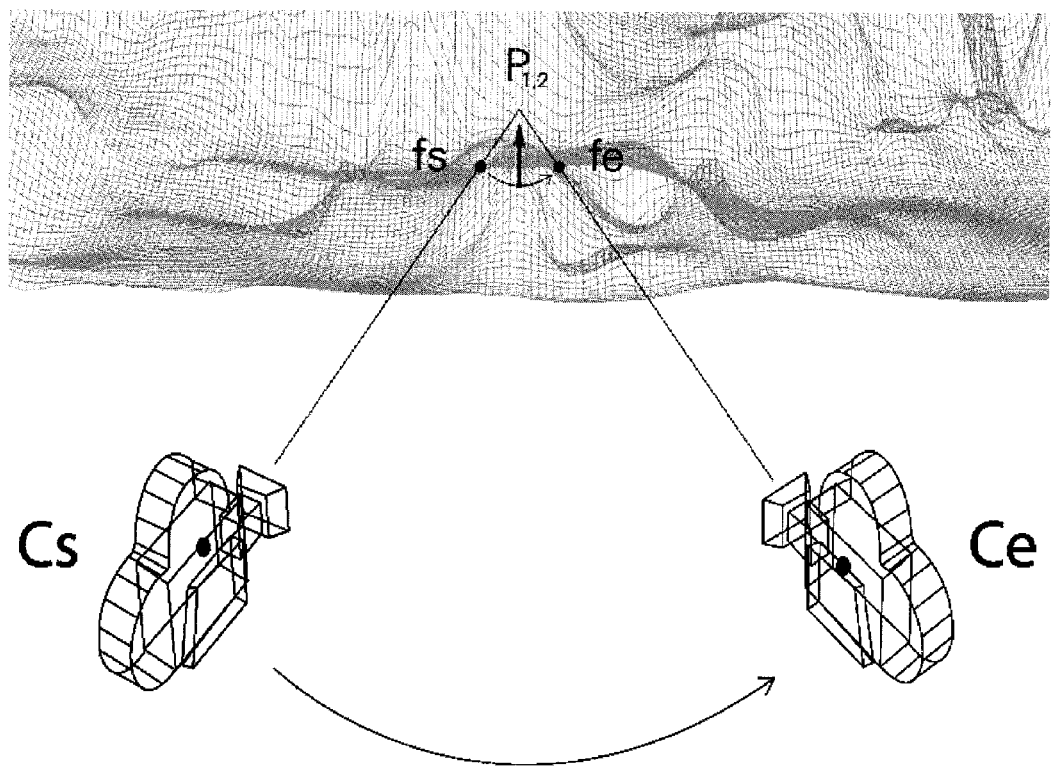
FIG. 5 is a diagram showing an example of a triangle method.

FIG. 5 is a diagram showing an example of a triangle method.

In an embodiment, in order to find the accurate position of the mesh, as shown in FIG. 5, the triangle method is used. In FIG. 5, fs and fe are starting position and ending position of the feature path through the mesh surface for the frame, respectively. The starting position Cs of the camera and the ending position Ce correspond to the camera positions for the starting position fs of the feature point and the ending position fe of the feature point. If the triangle method is used, the actual position of the feature point for the i-th frame can be calculated.

The starting position fs of the feature point for the i-th frame is denoted by fis, the ending point fe of the feature point for the i-th frame is denoted by fie, and the starting position Cs of the camera and the ending position Ce of the camera for the i-th frame are respectively denoted by Cis and Cie.

In 3D, an intersection or a closest point $P_1$ or $P_2$ between a line connecting the starting position Cis of the camera for the i-th frame and the starting position fis of the feature point and a line connecting the ending position Cie of the camera for the i-th frame and the ending position Fie of the feature point may be calculated from an inner product of a vector A for the line connecting the starting position Cis of the camera and the starting position fis of the feature point and a vector B of a line connecting the ending position Cie of the camera and the ending position fie of the feature point, as shown in Equation 4.

$$P_1 = Cs + t*(\mathit{fis} - Cs)$$

$$P_2 = Ce + s*(\mathit{fie} - Ce)$$

$$(P_2 - P_1) \cdot (\mathit{fis} - Cs) = 0$$

$$(P_2 - P_1) \cdot (\mathit{fie} - Cs) = 0 \quad \text{Equation 4}$$

Since all the points from the starting position fis of the feature point for the i-th frame to the ending position fie of the feature point for the i-th frame should move to the correct position, a vector for moving all the feature points to the correct positions may be generated. If the feature point and the camera position information are accurate, the two lines lie on one plane. However, due to errors, the two lines usually do not lie on a plane. These errors may be calculated using the distance between the two lines. In an embodiment, the errors are normalized and are applied to the calculated vectors as shown in Equation 5.

$$V_{mi} = V_i^* (1 - E_i) \quad \text{Equation 5}$$

If the vector $V_{mi}$ is calculated for all the sliding feature points, the vector map is generated.

If the vector map is generated, the mesh correction step (S230) is performed based on the vector map. In the mesh correction step (S230), the vacant region without feature points is considered. For mesh optimization, it is required that geometric details of the surface be preserved as much as possible in the mesh correction step (S230). When the mesh is corrected based on the vector map, applying the mesh in the direction of the vectors may distort nearby mesh. The vector map is divided into ground field and height field. The terrain geometry consisting in the height field is easily modified and used. The components X and Z of the vector map should be propagated. The height field may be optimized by using the Laplacian operator. In an embodiment, a constraint having two factors is applied to the Laplacian operator. One is generated in the vector map and the other is a high priority feature point. Equation 6 shows the Laplacian operator for optimizing the height field.

$$\text{Vector(pair)} = \{(x_p, y_p, z_p), (x_m, y_m, z_m)\} \quad \text{Equation 6}$$

$$E(V') = \sum_{i=1}^{n} \|T_i(V')\delta_i - L(v_i')\|^2 + \sum_{i=1}^{n} \|v_i' - u_i\|^2$$

$$u_i = (x_p + x_m, Y, z_p + z_m)$$

$$Y = H(x_p + x_m, z_p + z_m) - H(x_p, z_p) - y_n$$

In Equation 6, $x_p$, $y_p$ and $z_p$ are the starting positions of the vectors and $x_m$, $y_m$ and $z_m$ are the vectors. H is the function for finding the height of the mesh. If more detailed mesh is needed, the resolution of the particular region is increased and the Laplacian operator is applied to the height field so that interaction is possible.

If the mesh correction step (S230) is performed so as to finish the geometry error correction step (S200) of FIG. 1, the stereo conversion step (S300) is performed.

Figure 6:
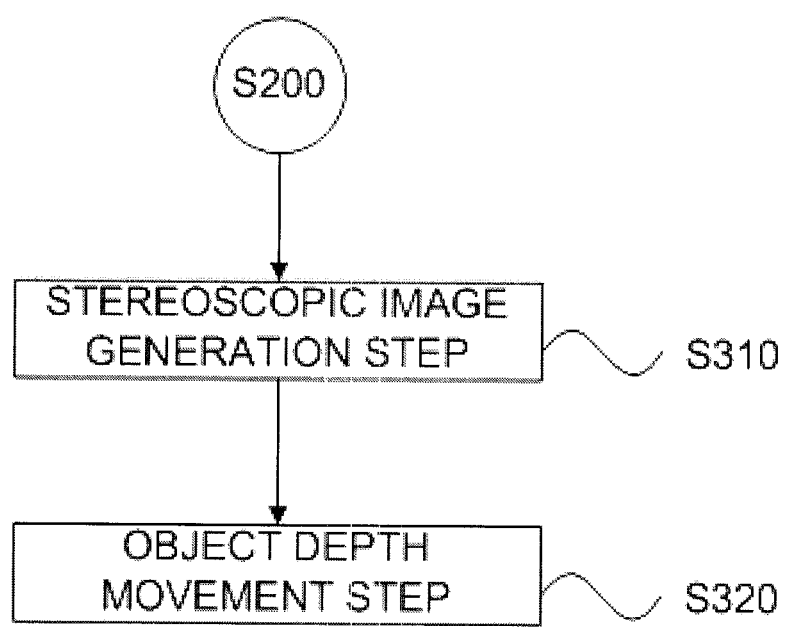
FIG. 6 is a diagram showing a stereo conversion step of FIG. 1.

FIG. 6 is a diagram showing the stereo conversion step of FIG. 1. As shown in FIG. 6, in an embodiment, the stereo conversion step (S300) includes a stereoscopic image generation step (S310) and an object depth movement step (S320).

In the stereoscopic image generation step (S310), the stereoscopic image is generated using the mesh. There are two ways to create the stereo. One is to observe from another camera using the texture on the mesh created by projection. This method is physically accurate and requires no hole-filling. While this method has an advantage when computer graphic (CG) objects are synthesized in a specific region, this method also has disadvantages in that it is hard to edit or revise the stereoscopic image.

The other method is to generate the stereoscopic image after creating a depth map using the mesh. The method for creating the stereoscopic image after generating the depth map has an advantage when computer graphic (CG) objects are synthesized in a specific region so that it is easy to edit or revise the stereoscopic image. In an embodiment, for example, the stereoscopic image is created using the depth map.

In the object depth movement step (S320), a final depth map is generated based on the moving object and the depth of the object of the stereoscopic image is adjusted based on the generated final depth map.

The inner-depth information of the terrain geometry may be a standard of global depth. It is necessary to use rotoscoping on the moving objects. There may be differences between the inner-object depth and the inter-object depth. However, such differences may be adjusted using the regions. The moving objects may be a standard for the depth of the region on which the object stands.

Existing image sequences often contain foreground objects that move around on a terrain. In the 2D to 3D stereo conversion process, such objects require separate treatment as they are not part of the terrain geometry. Typically, the foreground objects are roto-scoped and then a proper depth is assigned at each frame. This separate process, however, often leads to discrepancy in the depth values between the foreground object and the background terrain. As this discrepancy causes unpleasant artifacts as well as visual fatigue in stereo, it is very important to match the depths of the scene objects. An embodiment provides a simple but very effective solution for this situation. The depth of a foreground object is automatically determined as the depth of a terrain spot on which it is standing. The roto-scoped objects have depth values inherited from the corresponding terrain locations.

Accordingly, in an embodiment, the final depth map is generated based on the moving object and the object depth of the stereoscopic image is adjusted based on the final depth map.

Figure 7:
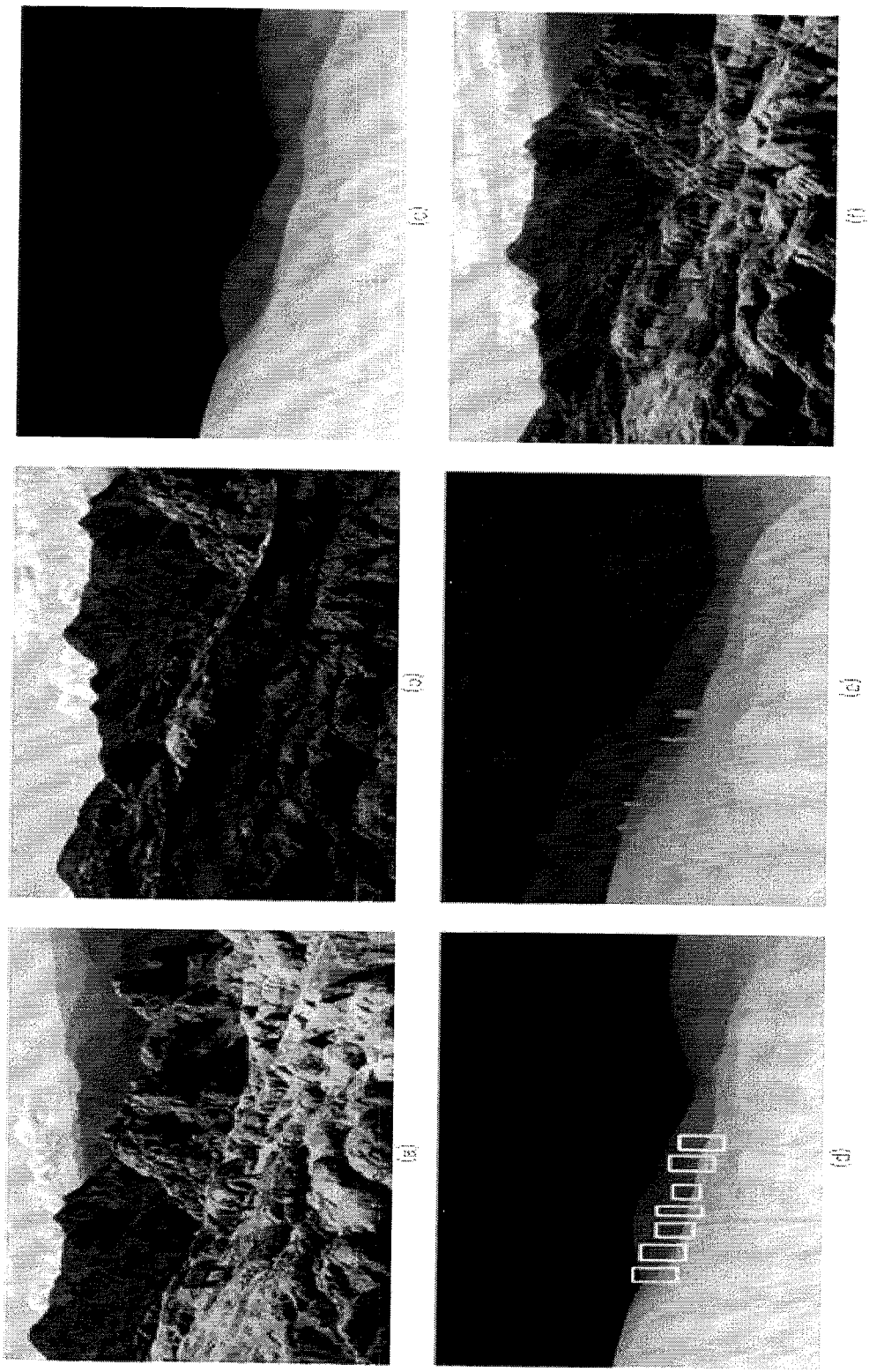
FIG. 7 is a diagram showing a process of converting an image into a stereoscopic image according to an automatic stereo conversion method of terrain geometry according to an embodiment.

FIG. 7 is a diagram showing a process of converting an image into a stereoscopic image according to an automatic stereo conversion method of terrain geometry of an embodiment.

In FIG. 7, (a) shows the original image, (b) shows the initial mesh, (c) shows the depth map extracted from the mesh, (d) shows the tracked moving objects, (e) shows the final depth information generated by rotoscoping the objects, and (f) shows the finally generated stereoscopic image.

Figure 8:
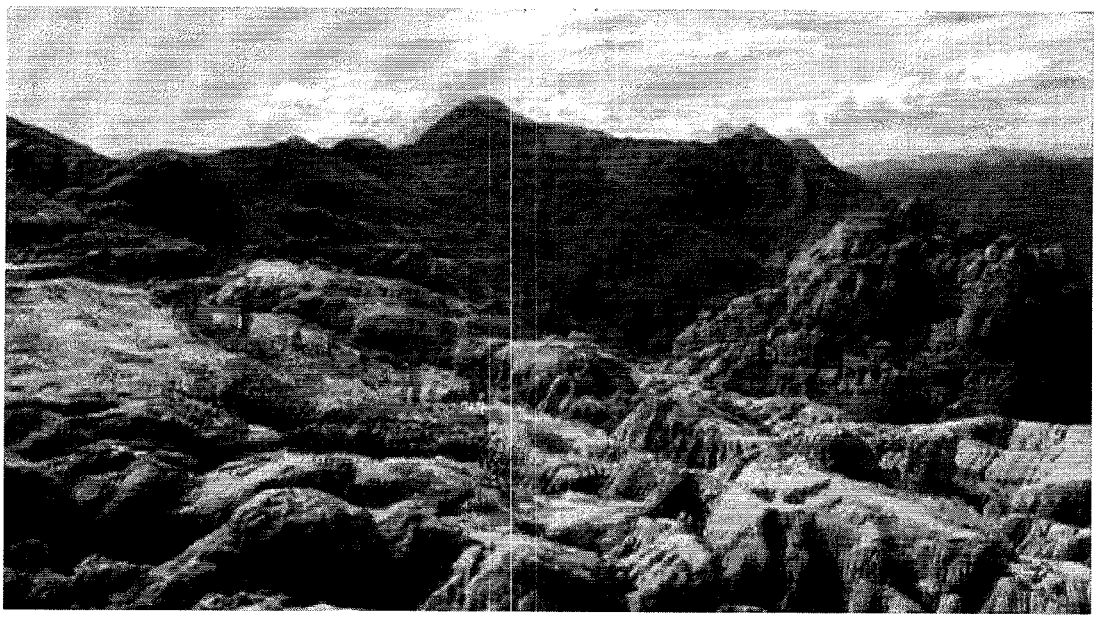
FIGS. 8 and 9 are diagrams showing converted stereoscopic images according to an embodiment.
Figure 9:
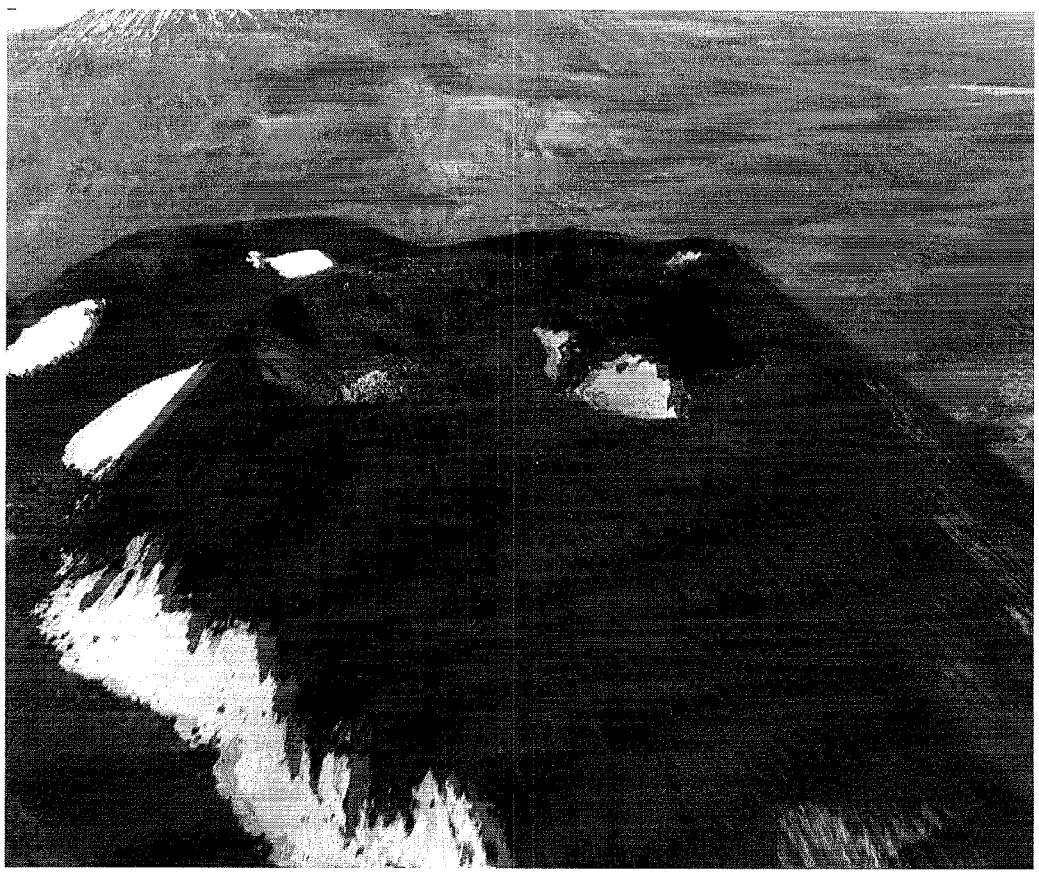

FIGS. 8 and 9 are diagrams showing stereoscopic images converted according to an embodiment.

As shown in FIGS. 8 and 9, the automatic stereoscopic image conversion method of the terrain geometry according to an embodiment may generate the stereoscopic image or 3D mesh of the terrain scenes for composition. The mesh fits the terrain shape even though the geometry is complex. The mesh based approach for stereo conversion has various advantages. First, the mesh based stereo conversion method provides time coherence of the generated depth map. The image based stereo conversion method of the related art has a problem that the stereoscopic image is not generated when the camera moves forward or backward and requires calibration for each frame. However, in the mesh based stereo conversion method, the mesh needs to be refined once and this change is automatically reflected in the depth maps for all frames. In addition, it is easy to edit the mesh and it is possible to unseamingly compose new elements into the terrain.

According to the stereoscopic image generation method of background terrain scenes, the system using the same, and the recording medium for the same of the present disclosure, since the stereoscopic image is generated based on the mesh, the mesh fits the terrain shape even though the geometry is complex. Further, time coherence can be enforced, the mesh can be easily edited, and new elements can be unseamingly composed into the terrain. Thus, it is possible to prevent a viewer who views the stereoscopic image from becoming tired.

This application has presented an automatic method for the generation of stereoscopic images of terrain scenes from a monocular sequence. An embodiment efficiently estimates an arbitrary terrain surface geometry. The estimation of a manageable mesh simplifies the identification, rotoscoping and posterior depth assignment of moving objects in the scene, as well as the compositing of additional CG contents and effects onto the terrain geometry. The proposed method inherently enforces the time coherency of the generated stereo sequences. This time coherency is also propagated to the editing of the obtained results as a result of the chosen mesh-based approach. The provided results confirm that the presented method can produce quality stereo conversion from monocular image sequences and that it can be easily integrated with existing industry working pipelines through inclusion in various 3D packages.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A stereoscopic image generation method of background terrain scenes, the method comprising:
    creating, by using a computer processor, an initial mesh using terrain geometry based on image sequences;
    generating, by using the computer processor, a projection map;
    extracting, by using the computer processor, a plurality of feature points of the initial mesh using the projection map;
    detecting, by using the computer processor, sliding feature points of the plurality of feature points corresponding to error regions of the initial mesh, generating a plurality of vectors for fixing the sliding feature points such that the error regions are corrected, and generating the vector map;
    generating, by using the computer processor, the corrected mesh using the vector map; and
    generating, by using the computer processor, a stereoscopic image using the corrected mesh,
    wherein said extracting the plurality of feature points includes
        projecting the image sequences to the initial mesh for each frame of the image sequences and generating texture maps,
        generating visibility maps using a ray tracing method so as to represent a visible area and an invisible area for each frame in the initial mesh,
        composing the texture maps and the visibility maps so as to generate the projection map, and
        applying scale-invariant feature transform (SIFT) to the projection map so as to extract the plurality of feature points, and
    wherein said generating the vector map includes
        excluding more than one feature points of the plurality of feature points on or near the invisible area if the invisible area of the initial mesh is detected by the visibility maps,
        determining whether or not each of the remaining plurality of feature points except for the more than one excluded feature points of the plurality of feature points moves,
        determining positions where the moving feature points are placed, and
        generating the plurality of vectors to move the moving feature points such that the moving feature points are fixed to the determined positions and generating the vector map.

2. The stereoscopic image generation method according to claim 1, wherein said creating the initial mesh includes generating the initial mesh using a radial basis function (RBF) method.

3. The stereoscopic image generation method according to claim 1, wherein said composing the texture maps is performed using the following equation:

$$T_i(x,y) = \text{Color of } M(x,z): \text{ when } I_i \text{ is projected from } C_i$$

wherein i is a frame number, y equals z, $T_i$ is the texture map of an i-th frame, M is the initial mesh, $I_i$ is an image of the i-th frame and $C_i$ is a camera position of the i-th frame.

4. The stereoscopic image generation method according to claim 3, wherein said generating the visibility maps is performed using the following equation:

$$V_i(x, y) = \begin{cases} 1 & \text{if } M \text{ is visible from } C_i \\ 0 & \text{if } M \text{ is invisible from } C_i, \end{cases}$$

wherein $V_i$ is a visibility of the i-th frame of the initial mesh.

5. The stereoscopic image generation method according to claim 4, wherein said generating the projection map is performed using the visibility maps as alpha channels using the following equation:

$$TV_i(x,y) = T_i(x,y) * V_i(x,y),$$

wherein $TV_i$ is the projection map of the i-th frame of the initial mesh.

6. The stereoscopic image generation method according to claim 1, wherein said determining the positions where the moving feature points are placed is performed by using a triangle method.

7. The stereoscopic image generation method according to claim 6, wherein the positions where the moving feature points are placed are calculated using the following equations:

$$P_1 = Cs + t*(fis - Cs);$$

$$P_2 = Ce + s*(fie - Ce);$$

$$(P_2 - P_1) \cdot (fis - Cs) = 0; \text{ and}$$

$$(P_2 - P_1) \cdot (fie - Cs) = 0,$$

wherein fis and fie respectively denote a starting position and an ending position of the feature point for the i-th frame, Cs and Ce respectively denote a starting position and an ending position of a camera, and $P_1$ and $P_2$ respectively denote one of an intersection or a closest point between a line connecting Cs and fis and a line connecting Ce and fie.

8. The stereoscopic image generation method according to claim 7, wherein the vector map is generated by the plurality of vectors calculated using the following equation with respect to the moving feature points:

$$Vm_i = V_i * (1-E_i),$$

wherein $E_i$ denotes $e_i/EM$, $e_i$ denotes error factor of feature point for i-th frame, EM denotes max value of all error factors, $V_i$ denotes initial moving vector of feature point for i-th frame, and $Vm_i$ denotes corrected moving vector of feature point for i-th frame.

9. The stereoscopic image generation method according to claim 8, wherein said generating the corrected mesh includes applying a Laplacian operator to the vector map using the following equation:

$$\text{Vector(pair)} = \{(x_p, y_p, z_p), (x_m, y_m, z_m)\}$$

$$E(V') = \sum_{i=1}^{n} \|Ti(V')\delta_i - L(v'_i)\|^2 + \sum_{i=1}^{n} \|v'_i - u_i\|^2$$

$$u_i = (x_p + x_m, Y, z_p + z_m)$$

$$Y = H(x_p + x_m, z_p + z_m) - H(x_p, z_p) - y_n$$

wherein $x_p$, $y_p$ and $z_p$ denote the starting positions of the vectors, $x_m$, $y_m$ and $z_m$ denote the vectors, H denotes a function for finding the height of the mesh, E denotes minimum energy function, V' and v' denote i-th vector of corrected mesh, Y denotes height value of corrected target point, and $u_i$ denotes corrected target point of i-th vector.

10. The stereoscopic image generation method according to claim 9, wherein said generating the stereoscopic image includes:
generating a depth map using the corrected mesh; and
generating a final depth map based on moving objects and adjusting the depths of the objects of the stereoscopic image based on the generated final depth map.

11. A non-transitory recording medium having recorded thereon a program command for generating a stereoscopic image of background terrain scenes, the program command comprising:
creating an initial mesh using terrain geometry based on image sequences;
generating a projection map;
extracting a plurality of feature points of the initial mesh using the projection map;
detecting sliding feature points of the plurality of feature points corresponding to the error regions of the initial mesh, generating a plurality of vectors for fixing the sliding feature points such that the error regions are corrected, and generating the vector map;
generating the corrected mesh using the vector map; and
generating a stereoscopic image using the corrected mesh, wherein said extracting the plurality of feature points includes
projecting the image sequences to the initial mesh for each frame of the image sequences and generating texture maps,
generating visibility maps using a ray tracing method so as to represent a visible area and an invisible area for each frame in the initial mesh,
composing the texture maps and the visibility maps so as to generate the projection map, and
applying scale-invariant feature transform (SIFT) to the projection map so as to extract the plurality of feature points, and
wherein said generating the vector map includes
excluding more than one feature points of the plurality of feature points on or near the invisible area if the invisible area of the initial mesh is detected by the visibility maps,
determining whether or not each of the remaining plurality of feature points except for the more than one excluded feature points of the plurality of feature points moves,
determining positions where the moving feature points are placed, and
generating the plurality of vectors to move the moving feature points such that the moving feature points are fixed to the determined positions and generating the vector map.

12. A computer system for generating a stereoscopic image of background terrain scenes, the computer system including a computer processor comprising:
creating an initial mesh using terrain geometry based on image sequences;
generating a projection map;
extracting a plurality of feature points of the initial mesh using the projection map;
detecting sliding feature points of the plurality of feature points corresponding to the error regions of the initial mesh, generating a plurality of vectors for fixing the sliding feature points such that the error regions are corrected, and generating the vector map;
generating the corrected mesh using the vector map; and
generating a stereoscopic image using the corrected mesh, wherein said extracting the plurality of feature points includes
projecting the image sequences to the initial mesh for each frame of the image sequences and generating texture maps,
generating visibility maps using a ray tracing method so as to represent a visible area and an invisible area for each frame in the initial mesh,
composing the texture maps and the visibility maps so as to generate the projection map, and
applying scale-invariant feature transform (SIFT) to the projection map so as to extract the plurality of feature points, and
wherein said generating the vector map includes
excluding more than one feature points of the plurality of feature points on or near the invisible area if the invisible area of the initial mesh is detected by the visibility maps,
determining whether or not each of the remaining plurality of feature points except for the more than one excluded feature points of the plurality of feature points moves,
determining positions where the moving feature points are placed, and
generating the plurality of vectors to move the moving feature points such that the moving feature points are fixed to the determined positions and generating the vector map.

* * * * *